United States Patent [19]

Takayama et al.

[11] Patent Number: 4,675,753
[45] Date of Patent: Jun. 23, 1987

[54] INFORMATION SIGNAL RECORDING AND REPRODUCING APPARATUS

[75] Inventors: Nobutoshi Takayama; Isao Harigaya; Kenichi Nagasawa, all of Kanagawa, Japan

[73] Assignee: Canon Kabushiki Kaisha

[21] Appl. No.: 816,987

[22] Filed: Jan. 9, 1986

Related U.S. Application Data

[63] Continuation of Ser. No. 529,965, Sep. 7, 1983, abandoned.

[30] Foreign Application Priority Data

Sep. 10, 1982 [JP] Japan ................................ 57-158372
Sep. 10, 1982 [JP] Japan ................................ 57-158373
Sep. 10, 1982 [JP] Japan ................................ 57-158374
Sep. 13, 1982 [JP] Japan ................................ 57-160161

[51] Int. Cl.⁴ .......................... G11B 5/02; G11B 15/46
[52] U.S. Cl. ........................................ 360/27; 360/73
[58] Field of Search .......................... 360/27, 14.2, 73

[56] References Cited

U.S. PATENT DOCUMENTS

| 3,869,719 | 4/1975 | Jenkins | 360/71 |
| 4,293,880 | 10/1981 | Tsukada et al. | 360/70 |
| 4,302,785 | 11/1981 | Mussarr | 360/72.1 |
| 4,363,043 | 12/1982 | Kitamura | 360/72.2 |
| 4,408,235 | 10/1983 | Ito | 360/71 |
| 4,442,464 | 4/1984 | Ito | 360/74.4 |
| 4,490,755 | 12/1984 | Tokuyama | 360/70 |

Primary Examiner—Vincent P. Canney
Attorney, Agent, or Firm—Toren, McGeady & Associates

[57] ABSTRACT

An information signal recording and reproducing apparatus includes first recording apparatus for recording an information signal on a recording medium; first reproducing apparatus for reproducing the information signal from the recording medium; second recording apparatus for recording a control signal on the recording medium (the control signal corresponding to an optional quantity of the information signal); second reproducing apparatus for reproducing the control signal from the recording medium; and control apparatus for controlling the reproducing action of the first reproducing apparatus in response to the control signal reproduced by the second reproducing apparatus.

16 Claims, 22 Drawing Figures

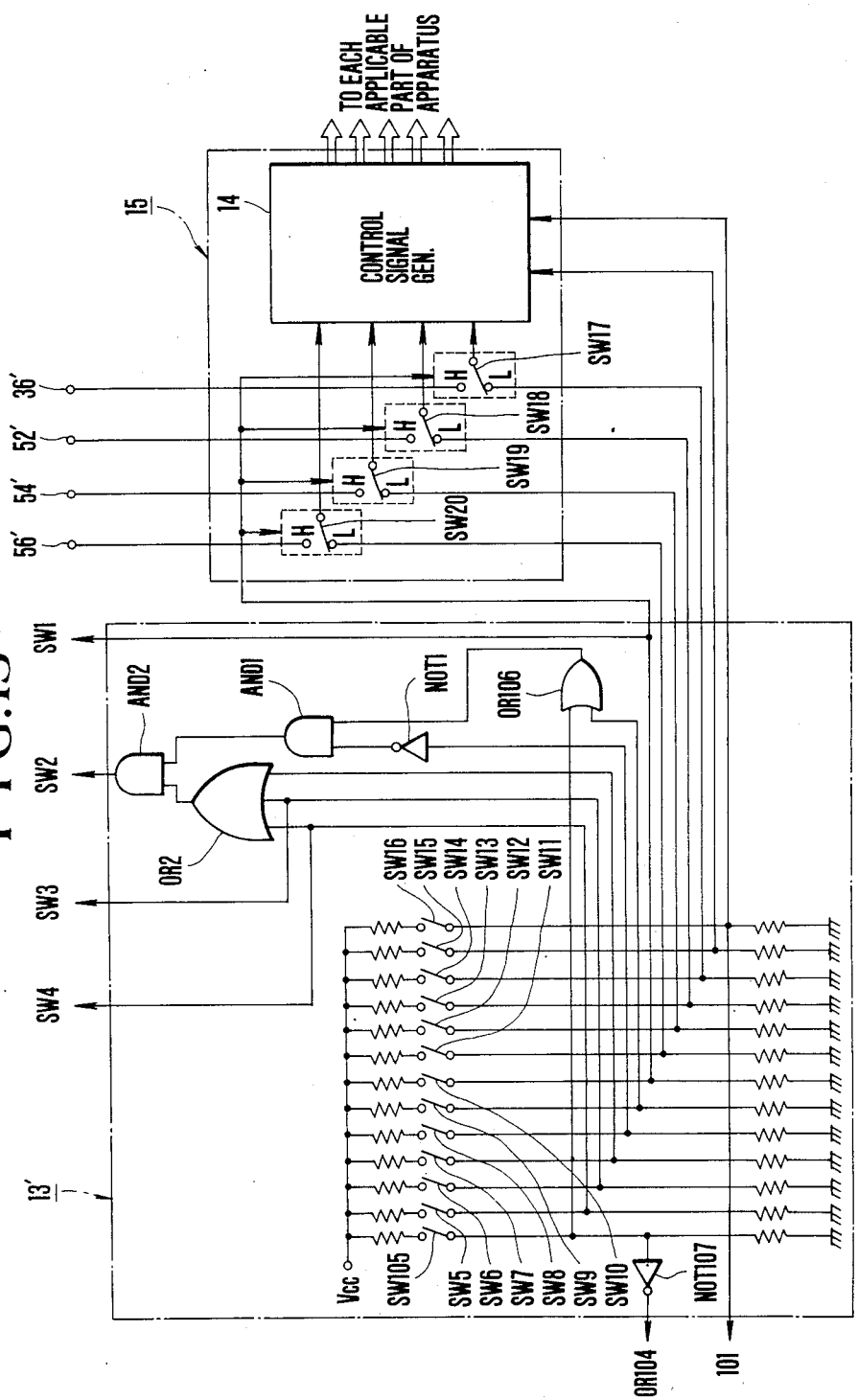

INFORMATION SIGNAL RECORDING AND REPRODUCING APPARATUS

This is a continuation of application Ser. No. 529,965, filed Sept. 7, 1983, now abandoned.

BACKGROUND OF THE INVENTION

1. Field of the Invention

This invention relates to an information signal recording and reproducing apparatus and more particularly to an information signal recording and reproducing apparatus which records a signal for controlling the apparatus on a recording medium used for recording information signals.

2. Description of the Prior Art

In this specification, magnetic recording and reproducing apparatus, or video tape recorders, of the type which records a video signal as an information signal on a magnetic tape by means of rotating heads (hereinafter called VTR for short) will be used as an example of information signal recording and reproducing apparatus.

VTR's of the type which permit so-called varied speed reproduction, in which reproduction of records from magnetic tapes by allowing the tapes to travel at different speeds from that used in recording, have become popular during recent years. The techniques required for varied speed reproduction has also advanced even in the field of home VTR's. As a result, there have been developed some improved home VTR systems that are capable of precluding noise bars from appearing on reproduced pictures obtained by varied speed reproduction. This is carried out by allowing the tape to travel at a different speed from the standard reproduction speed, such as in high speed search reproduction, slow motion reproduction, still picture reproduction, etc. These improved systems include, for example, a system using a dynamic tracking method in which rotating video heads are deflected by means of piezo-electric elements or the like; a system using double azimuth heads; etc. With the use of these systems, special high quality reproduction pictures have become obtainable. As a result, varied speed reproduction facilities provided in VTR's are more often used.

With respect to recording on the other hand, a continuous recording operation over a long period of time has become possible. Hence, it has become a popular practice to continuously record many scenes on a signal piece of recording tape and to have some of these recorded scenes selectively reproduced later, as desired. In that event, the user has been required to find each of the desired parts of the record from the tape and to operate the apparatus by selecting the reproduction mode thereof for each desired part. Such searching and selecting operations on a long tape has been troublesome. To simplify the searching process for finding a desired recorded scene, VTR's which are capable of automatically searching the initial part of each desired record have been developed. In the VTR having this feature, an indexing or search-out signal is recorded at a part of the recording medium corresponding to the initial part of every record during a recording operation. During a reproducing operation, the apparatus is stopped when this signal is reproduced and then the apparatus is set into a normal reproducing mode. In the search-out mechanism of the prior art, however, the apparatus is merely brought to a stop and into a standard reproduction mode after a desired initial part is set in place. With that mechanism employed for the search-out purpose, the apparatus is set into the standard reproduction mode every time a record starting part is found. Then, if this record starting part is not that of the desired scene, the search operation must be repeatedly performed until the desired scene is found. Therefore, it has been not only time consuming but also troublesome to find a picture from a magnetic tape with a long recording time. It has been especially troublesome where many short scenes are recorded on the tape, as the apparatus must repeatedly go back to the standard reproduction mode each time the initial part of each scene is found.

Conversely, when reach record is long, there is high probability that a desired scene is recorded at a great distance from the initial part of each record and the desired scene cannot be readily found by a search operation. An arrangement which avoids this trouble by making each record short then returns to the above troublesome search-out operation.

Furthermore, in accordance with the prior art VTR's, in situations where a desired scene is to be reproduced by a reproduction mode other than the standard reproduction mode (for example, by varied speed reproduction), the apparatus must be stopped after a search-out process and then the apparatus must be once again set into the desired reproduction mode. Such operation has also been quite troublesome.

In view of the above shortcomings of the prior art, it is an object of the present invention to provide an information signal recording and reproducing apparatus which enables the operator to promptly remove the desired information without any trouble.

It is another object of the invention to provide an information signal recording and reproducing apparatus which enables the operator to freely remove a desired recorded signal from records even when the desired signal is not located in the initial part of the record.

It is still another object of the invention to provide an information signal recording and reproducing apparatus which enables the operator to reproduce a desired information signal in a desired reproducing operation mode.

SUMMARY OF THE INVENTION

These objects are attained in an information signal recording and reproducing apparatus which includes first recording means for recording an information signal on a recording medium together with first reproducing means for reproducing the information signal from the recording medium, second recording means for recording, on the recording medium, a control signal corresponding to an arbitrarily determined amount of the information signal and second reproducing means for reproducing the control signal from the recording means. In addition, the apparatus also includes control means for controlling the first reproducing means in accordance with the control signal reproduced by the second reproducing means.

The above objects and features of the invention will become apparent from the following detailed description of preferred embodiments thereof taken in conjunction with the accompanying drawings.

BRIEF DESCRIPTION OF THE DRAWINGS

FIG. 13 is a circuit diagram showing, by way of example, the operation switch and the system control element of the VTR shown in FIG. 12.

DETAILED DESCRIPTION OF PREFERRED EMBODIMENTS

Figure 1:
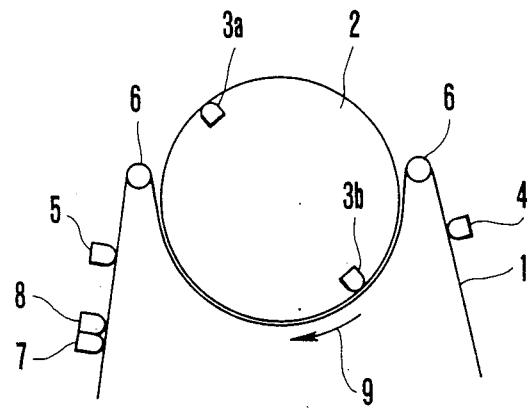
FIG. 1 is a schematically view which shows a tape transport system of a VTR in an embodiment of the present invention.

FIG. 1 shows the tape transport system of a VTR according to the present invention in an embodiment thereof.

Figure 2:
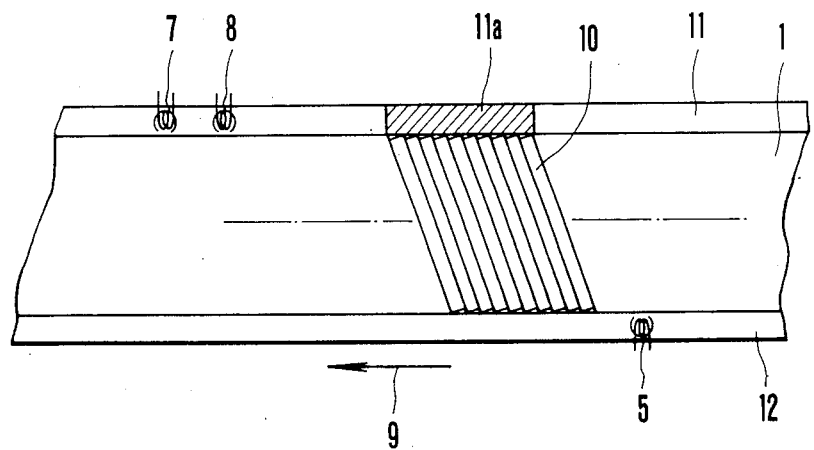
FIG. 2 is a schematic view which shows recording loci drawn on a magnetic tape by a VTR according to the invention.

FIG. 2 shows a recording pattern drawn by the VTR on a magnetic tape. These drawings shown a magnetic tape 1, a rotating drum 2, recording and reproducing heads 3a and 3b which are provided for recording and reproducing a video signal as an information signal; an erasing head 4 which is provided for erasing records over the whole width of the magnetic tape 1; an audio head 5 which is provided for recording and reproducing an audio signal; extracting pins 6 for winding the magnetic tape 1 round the rotating drum 2; another head 7 which is provided for recording and reproducing a mode control signal; an erasing head 8 for erasing the mode control signal; and an arrow 9 which indicates the travelling direction of the magnetic tape 1.

The recording and reproducing heads 3a and 3b record a video signal while forming oblique recording tracks 10. Meanwhile, the audio head 5 records an audio signal in an audio track 12. Furthermore, the head 7 records in a track 11 a mode control signal relative to the reproducing operation mode of the apparatus.

Figure 3:
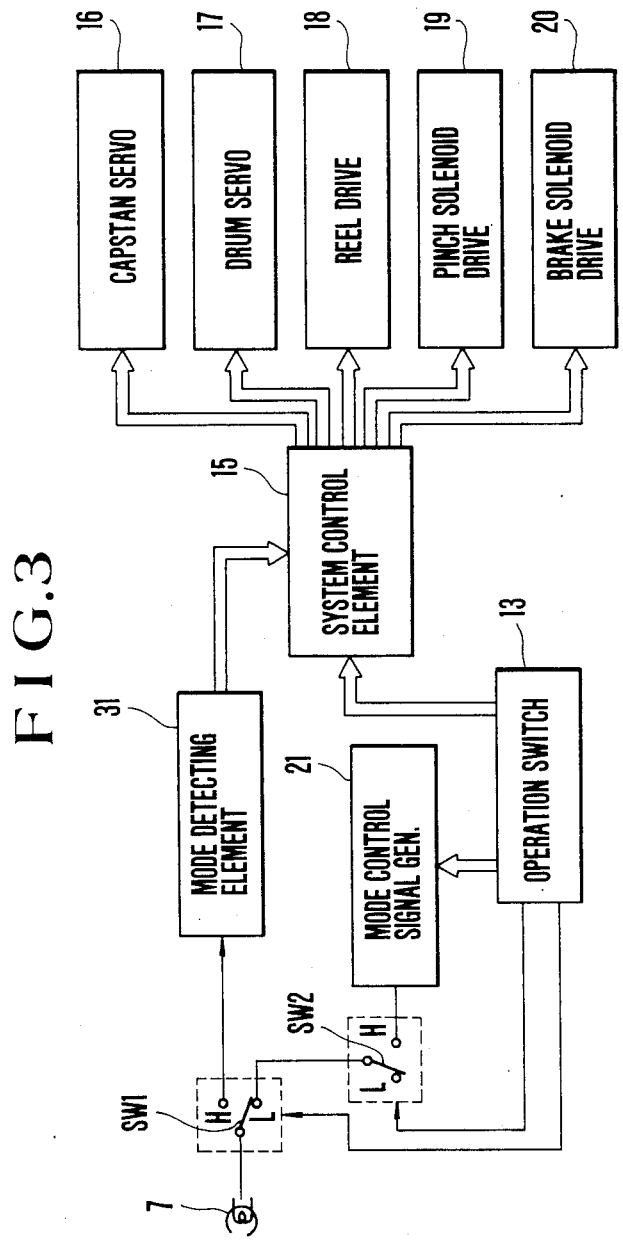
FIG. 3 is a block diagram showing the basic arrangement of a VTR in an embodiment of the invention.
Figure 4:
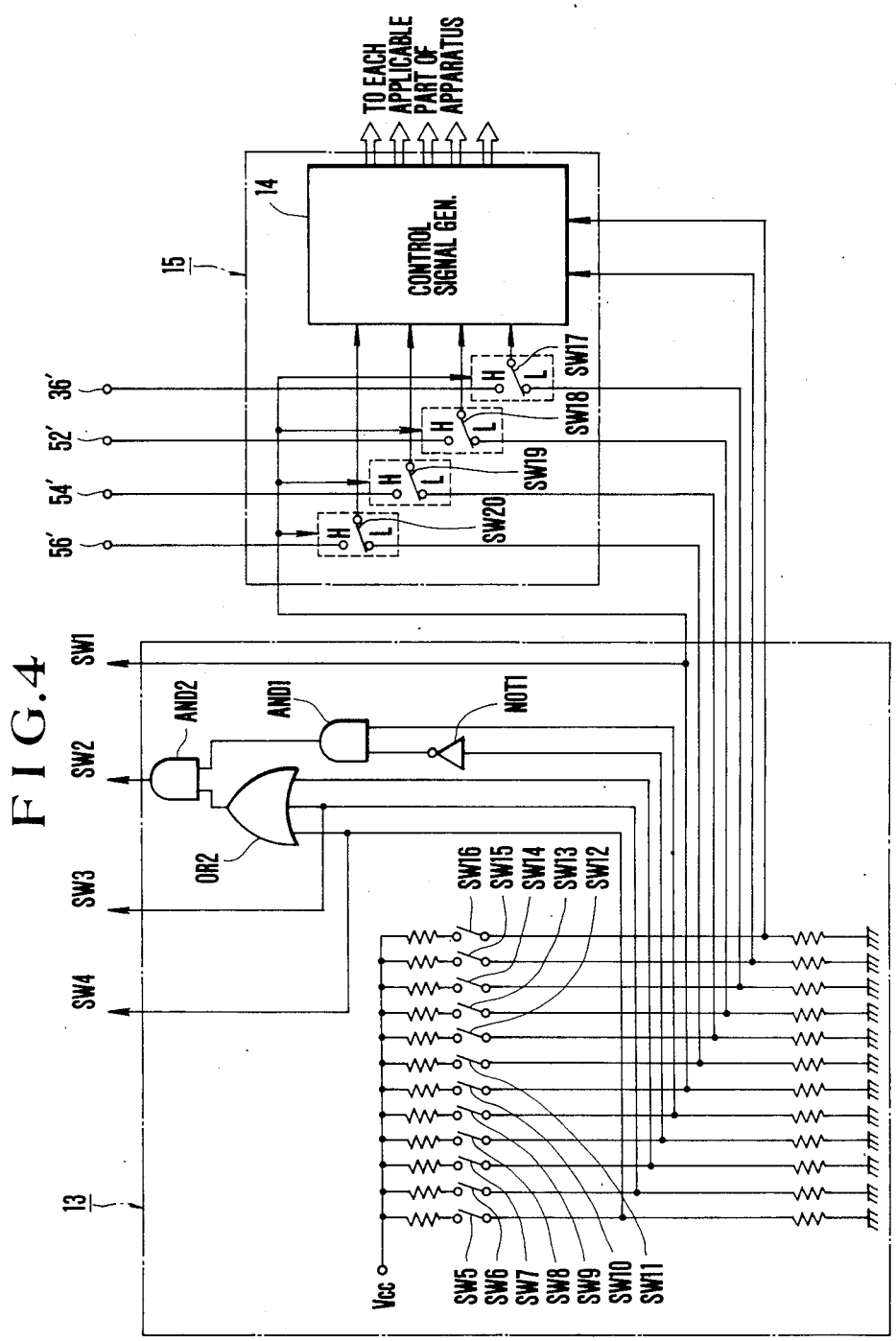
FIG. 4 is a circuit diagram showing an operation switch and a system control element used in the VTR shown in FIG. 3.
Figure 5:
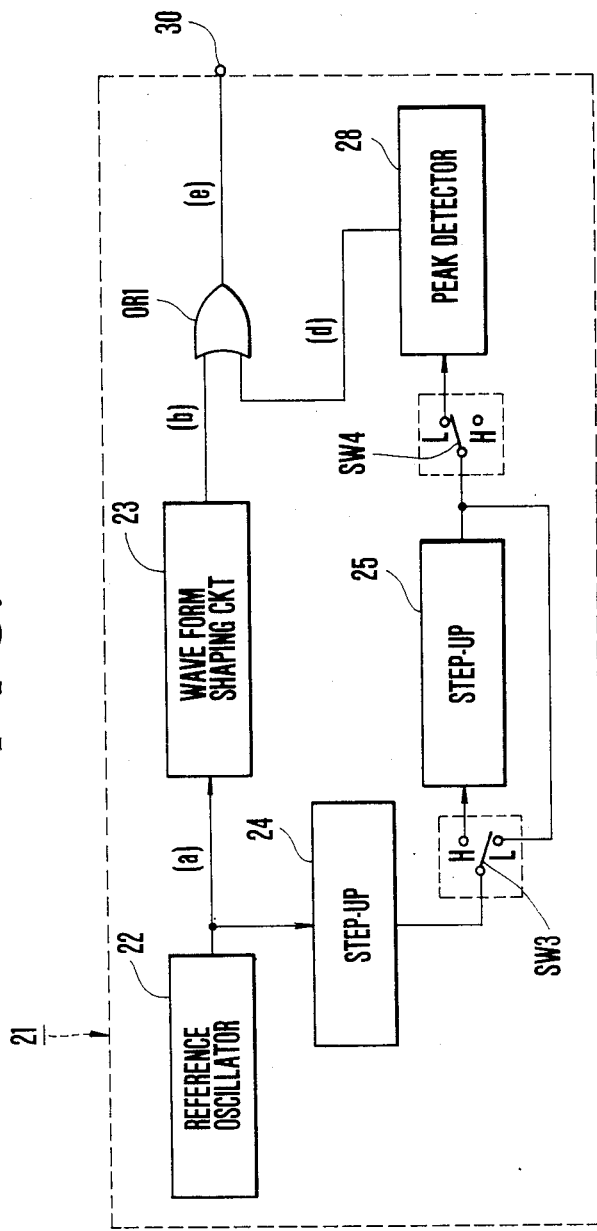
FIG. 5 is a block diagram showing, by way of example, a mode control signal generator used in the VTR shown in FIG. 3.
Figure 6:
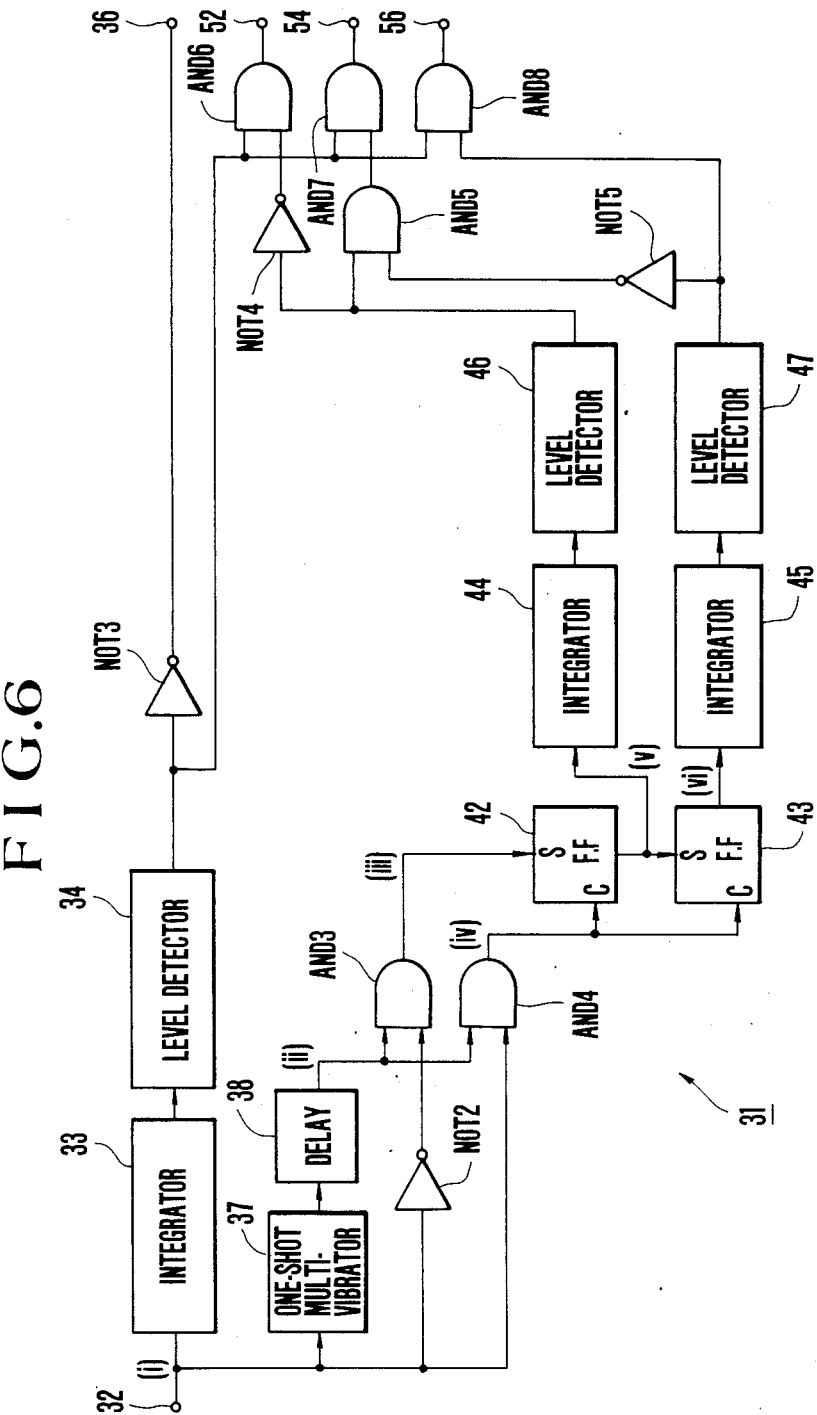
FIG. 6 is a circuit diagram showing, by way of example, a mode detection element used in the VTR shown in FIG. 3.

The basic arrangement of this VTR according to the invention is shown in FIG. 3. An operation switch 13 and a system control element 15, which are shown in FIG. 3, are arranged as shown in FIG. 4. A mode control signal generator 21, which is shown in FIG. 3, is arranged as shown in FIG. 5. A mode detection element 31 which is shown in FIG. 3 is arranged as shown in FIG. 6.

Referring to FIG. 4, a group of switches SW5-SW16 open and close as the operation switch 13 of the VTR is operated by the user. When a mode control signal is recorded, the switches SW5-SW8 designate a reproducing operation mode corresponding to the recorded mode control signal. The switch SW9 instructs recording of the mode control signal. The switch SW10 instructs reproduction of the mode control signal recorded in the track 11 (hereinafter called control reproduction). The switch SW11 instructs a high speed searching reproducing operation. The switch SW12 instructs a slow motion reproducing operation. The switch SW13 instructs a standard reproducing operation. The switch SW14 instructs quick feeding. The switch SW15 instructs rewinding. The switch SW16 instructs a video signal recording. Although not shown, the seven switches SW10-SW16 are either mechanically or electrically arranged in such a manner that when one switch turns on, the other switches turn off. The four switches SW5-SW8 are also arranged likewise.

With the VTR arranged as described above, it operates as follows when a video signal is to be recorded: The switch 16 within the operation switch 13 is turned on to instruct recording of a video signal. Then, the switch SW1, which is shown in FIG. 3, is connected to one side L. This is because the switch SW10 is off when the switch SW16 is turned on and, accordingly, a low level control signal is supplied to the switch SW1, as shown in FIG. 4. (Furthermore, in FIG. 3, the switch 1 is shifted to one side H when the control signal level is high and to the other side L when the signal level is low.) When recording a video signal alone, the switch SW9 is off. The output level of an AND gate AND1 becomes low. Accordingly, the output level of an AND gate AND2 also becomes low. As a result, another switch SW2 is shifted to one side L.

Furthermore, a signal instructing video signal recording is supplied to a control signal generator 14 of the system control element 15. The control signal generator 14 supplies a control signal to each applicable part of the apparatus in accordance with the mode designated by the operation switch 13 or by the mode detection element 31. In this instance, the recording and reproducing heads 3a and 3b record a video signal which has been transformed by a signal processing system, which is not shown, into a signal form suitable for recording. Meanwhile, an audio signal is recorded by the audio head 5.

Again referring to FIG. 3, the VTR system includes a servo system circuit 16 for a capstan which causes the magnetic tape 1 to travel; another servo system circuit 17 which is for the rotating drum 2; a reel drive circuit 18 provided for driving a supply reel on which the magnetic tape 1 is and a take-up reel, though these reels are not shown; a pinch solenoid drive circuit 19 brings a pinch roller and the capstan, which are not shown, into pressed contact with each other and separates them from each other; and a brake solenoid drive circuit 20 which brings the supply and take-up reels to a stop.

When a mode control signal is to be recorded in the track 11 during a video signal recording operation, the embodiment operates as follows: The switch SW9 turns on while the video signal is being recorded. Then, the switch SW9 instructs recording of the mode control signal. As a result, the mode control signal, which corresponds to each mode, is recorded in the track 11. However, when a quick feeding mode is to be designated, the switch SW8 turns on. This causes the output level of an inverter $\overline{NOT1}$ to lower. Accordingly, the output levels of both the AND gates AND1 and AND2 become low. The switch SW2 is shifted to the side L. Therefore, the mode control signal is not recorded. This means that the absence of any mode control signal in the track 11 is equivalent to recording a mode control signal corresponding to the quick feeding mode.

Among the switches SW5–SW8, when any of them other than the switch SW8 is turned on, the output levels of the AND gate AND1 and that of an OR gate OR2 both become high. This causes the output level of the AND gate AND2 to become high and the switch SW2 is shifted to the side H. When the switch SW2 is shifted to the side H, the head 7 records a mode control signal produced by a mode control signal generator 21 in the track 11.

Figure 7:
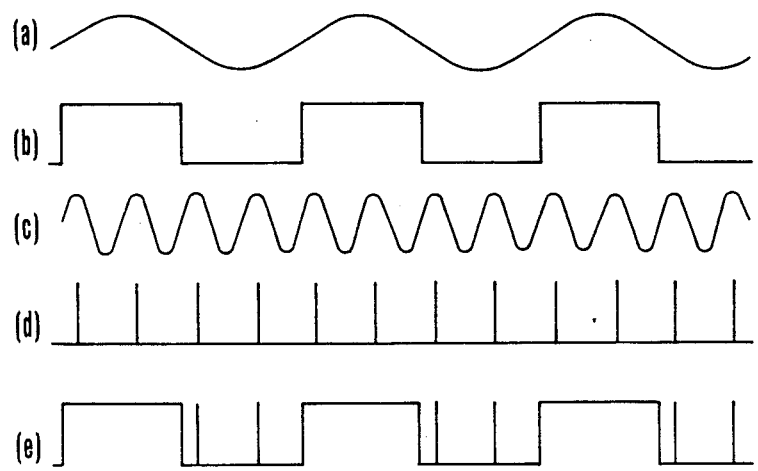
FIG. 7, (a)-(e), is a timing chart showing the wave form of each part shown in FIG. 5.

Operation of the mode control signal generator 21 is as follows: FIG. 7 shows the wave forms of outputs (a)–(e) of elements shown in FIG. 5, obtained when the mode control signal generator 21 produces, by turning on the switch SW6 of FIG. 4, a mode control signal corresponding to a high speed searching operation mode. In FIG. 7, a wave form (a) represents a sinusoidal wave produced from a reference oscillator 22. The reference oscillator 22 produces the sinusoidal wave which is about several hundred Hz. A wave form shaping circuit 23 changes the sinusoidal wave (a) into a square wave of the same frequency. The output (b) of the shaping circuit 23 is supplied to an OR gate OR1. Meanwhile, the sinusoidal wave (a) is also supplied to a frequency step-up element 24. The switches SW3 and SW4 are shifted according to the mode designated by the operation switch 13. Assuming that the switch SW5 of the operation switch 13 is turned on designating the standard reproducing operation mode, the switch SW4 is shifted to one side H. Furthermore, when the switch SW6 is turned on designating a high speed searching operation mode, the switch SW3 is shifted to the side H and the switch SW4 to the side L. Furthermore, when the switch SW7 is turned on designating a slow motion reproducing operation mode, both the switches SW3 and SW4 are shifted to their sides L. Assuming that two step-up elements 24 and 25 are both double step-up elements, an input signal to a peak detection circuit 28 disappears when the standard reproducing operation mode is designated; it becomes a sinusoidal wave of frequency four times as high as that of the sinusoidal wave (a) produced from the reference oscillator 22 when the high speed searching operation mode is designated; and it becomes a sinusoidal wave of a frequency twice as high as that of the sinusoidal wave (a) when the slow motion reproducing operation mode is designated. A wave form (c), shown in FIG. 7, represents a wave form obtained when the high speed searching reproduction operation mode is designated. At the peak of the input sinusoidal wave (c), the peak detection circuit 28 produces trigger pules (d). The trigger pulses (d) are supplied to the OR gate OR1. The output (e) of the OR gate OR1 is then supplied as a program signal to the switch SW2 of FIG. 3. In short, the program signal (e) corresponds to the standard reproducing operation mode when the valley portion of its square wave does not have any pulse therein; corresponds to the slow motion reproducing operation mode when the valley portion has one pulse; and corresponds to the high speed searching reproducing operation mode when the valley portion has two pulses.

The ordinary reproducing operation of the embodiment without using any mode control signal is as follows: When one of the switches SW11–SW13 of the operation switch 13 is turned on instructing either high speed searching reproduction, slow motion reproduction or standard reproduction, the switch SW10 is off and the switch SW1 is on the side L. Switches SW17–SW20 are all shifted to their sides L. The control signal generator 14 supplies a control signal to each applicable part of the apparatus according to the mode designated by the operation switch 13.

Thus, even when reproducing without using any mode control signal, it is possible to have a mode control signal recorded by turning on the mode control signal recording instruction switch SW9, shifting the switch SW2 to the side H. Furthermore, even if a mode control signal has already been recorded in that instance, it is possible to record a new mode control signal by erasing the existing record of the track 11 with the erasing head 8. In erasing a recorded mode control signal, the switch SW9 and the switch, SW8 which instructs recording of a program signal (a mode control signal) corresponding to quick feeding, i.e. which instructs it against recording any program signal, are respectively turned on under this condition.

The control reproduction operation of the embodiment which is to be performed using the mode control signal of the track 11 is as follows: When the switch SW10 of the operation switch 13 is turned on to instruct control reproduction, the switch SW1 is shifted to the side H. The mode control signal reproduced by the head 7 is supplied to the mode detecting element 31. The mode detecting element 31 produces an output from a terminal 36, 52, 54 or 56 which corresponds to the reproduced mode control signal. Each of the switches SW17–SW20 is on the side H. The output from the terminal 36, 52, 54 or 56 is supplied to the control signal generator 14. The control signal generator 14 then supplies a control signal corresponding to the mode designated by the reproduced mode control signal to the applicable part of the apparatus.

Referring now to FIG. 6, the operation of the mode detecting element 31 is as follows: The reproduced mode control signal is supplied to a terminal 32. This input is applied to an integration circuit 33. The output level of the integration circuit 33 is determined by a level detection circuit 34. The circuit 34 then determines whether or not a mode control signal is recorded. The level detection circuit 34 produces a high level output when a mode control signal is recorded and a low level output when no mode control signal is recorded. With no mode control signal recorded, a terminal 36 produces a high level output which is obtained via an inverter NOT3. This high level output is supplied to the system control element 15 bringing the apparatus into the quick feeding mode.

Figure 8:
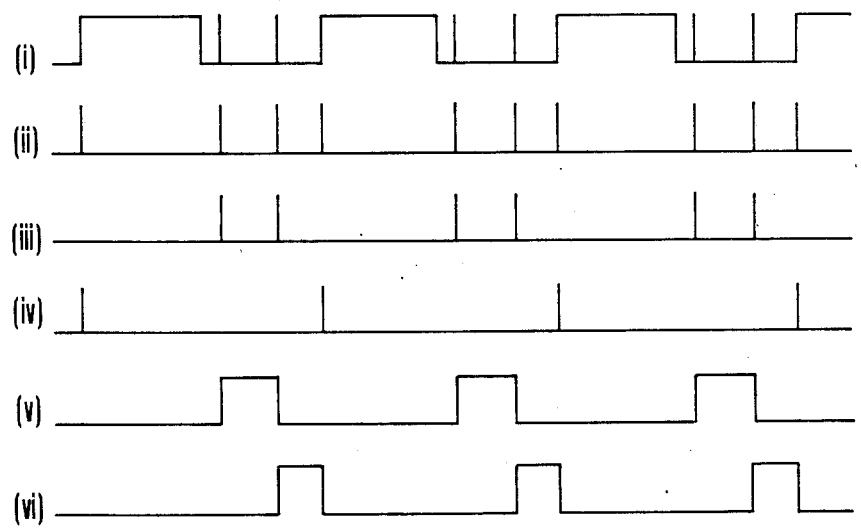
FIG. 8, (I)-(VI), is a timing chart showing the wave form of each part shown in FIG. 6.

The wave forms of the parts (i)–(vi) of FIG. 6 are shown in FIG. 8. This drawing represents a condition in which the mode control signal corresponding to high speed searching reproduction is produced by the mode control signal generation circuit 33 of FIG. 5 and is supplied to the terminal 32. A one-shot monostable multivibrator 37 is triggered by the rise of the input. The output of the multivibrator 37 is supplied to AND gates AND3 and AND4 via a delay circuit 38 which delays the output to a slight degree. Meanwhile, the mode control signal is supplied directly to the AND gate AND4 and is also supplied to the AND gate AND3 via an inverter NOT2. The output of the AND gate AND3 corresponds to the pulses appearing in the valley portion of the square wave of the mode control signal (i) as shown by a part (iii) in FIG. 8. The output of the AND gate AND4 corresponds to the rise of the square wave as shown by a part (iv) of FIG. 8. Thus, the mode corresponding to the mode control signal can be discriminated by detecting the number of the output pulses (iii) of the AND gate AND3 existing between the output pulses (iv) of the AND gate AND4.

FIG. 6 includes flip-flop (hereinafter called FF for short) circuits 42 and 43 which form a counter. These FF circuits 42 and 43 receive the output pulses (iii) of the AND gate AND3 as input pulses and the output pulses (iv) of the AND gate AND4 as clear pulses. The output levels of both the FF circuits 42 and 43 are low when there is no output pulse from the AND gate AND3 between the output pulses of the AND gate AND4. The FF circuit 42 alone produces a square wave when there is one output pulse from the AND gate AND3 between the output pulses of the AND gate AND4. Both the FF circuits 42 and 43 produce square waves when there are two or more output pulses from the AND gate AND3 between the output pulses of the AND gate AND4. The outputs of the FF circuits 42 and 43 are respectively supplied via integration circuits 44 and 45 to level detectors 46 and 47. The level detector 46 produces a high level output when the FF circuit 42 produces the square wave, while the level detector 47 produces a high level output when the FF circuit 43 produces the square wave output. The output of another level detector 34 is supplied to each of AND gates AND6, AND7 and AND8. When a mode control signal is recorded, the output of the level detector 34 is at a high level. Accordingly, the output of an inverter NOT4 is produced at a terminal 52, that of the AND gate AND5 at a terminal 54 and that of the level detector 47 at a terminal 56. In the event that there is no output pulse (iii) from the AND gate AND3 between the output pulses (iv) of the AND gate AND4, the output level of the inverter NOT4 becomes high and a high level output is produced from the terminal 52. This high level output is supplied to the system control element 15, which then brings the apparatus into the standard reproducing operation mode. When there is one pulse (iii) between the pulses (iv), a high level output is produced from the terminal 54; and if the number of the pulses (iii) between the pulses (iv) is two, a high level output is produced from the terminal 56. Then, these outputs result respectively in the slow motion reproducing operation mode and the high speed searching reproduction mode of the apparatus.

As described in the foregoing, control reproduction of the mode control signals recorded on the tape brings about the following results: The video signal is not reproduced and quick feeding is carried out for a portion of the tape 1 having no mode control signal recorded therein. For a portion of the tape 1 having a mode control signal recorded therein, the video signal is reproduced in a mode corresponding to the mode control signal reproduced from that portion.

With a mode control signal recorded only at a part of the track 11 corresponding to the initial part of a record, for example, if the ensuing part of a specific scene during the process of controlled reproduction is desired, control reproduction can be negated by turning off the switch SW10 while the video signal of the initial part of the record is being reproduced (in the standard, slow motion or searching mode) and then the ensuing part can be reproduced.

The arrangement described in the foregoing permits recording of mode control signals not only between one record and another but also in other parts, so that desired scenes can be promptly reproduced. Furthermore, it is also possible to allow passage of unnecessary parts between one record and another during control reproduction.

Furthermore, the reproducing operation mode for control reproduction is also freely selectable. Therefore, the desired scenes can be seen during the desired reproducing operation mode without any additional operation.

In this specific embodiment, the mode control signals are recorded and reproduced by means of the head 7. However, different heads 7 may be used for recording and reproduction of the mode control signals.

In the arrangement shown in FIG. 1, a quick feeding operation is carried out with the magnetic tape 1 being wound on the drum 2. However, the quick feeding operation can be carried out with the magnetic tape 1 in any condition other than the loading condition as long as the tape 1 comes in contact with the head 7.

Figure 9:
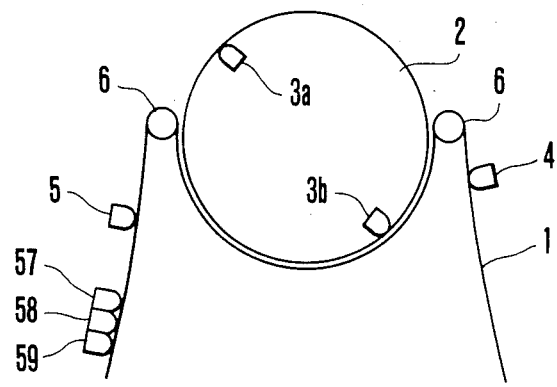
FIG. 9 is a schematic illustration showing a tape transport system of a VTR in another embodiment of the invention.
Figure 10:
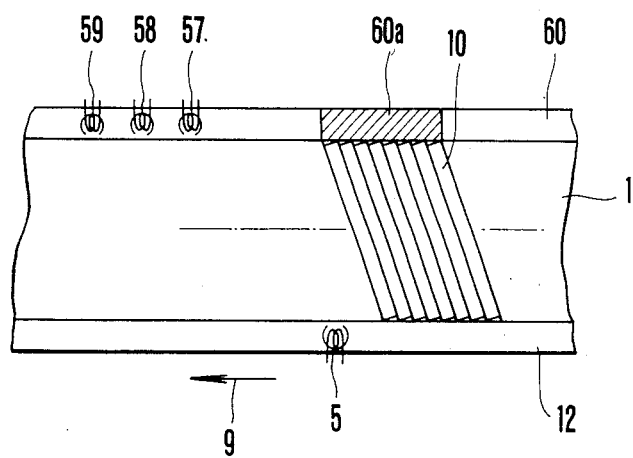
FIG. 10 is another schematic illustration showing recording loci drawn on a magnetic tape by the VTR in another embodiment of the invention.
Figure 11:
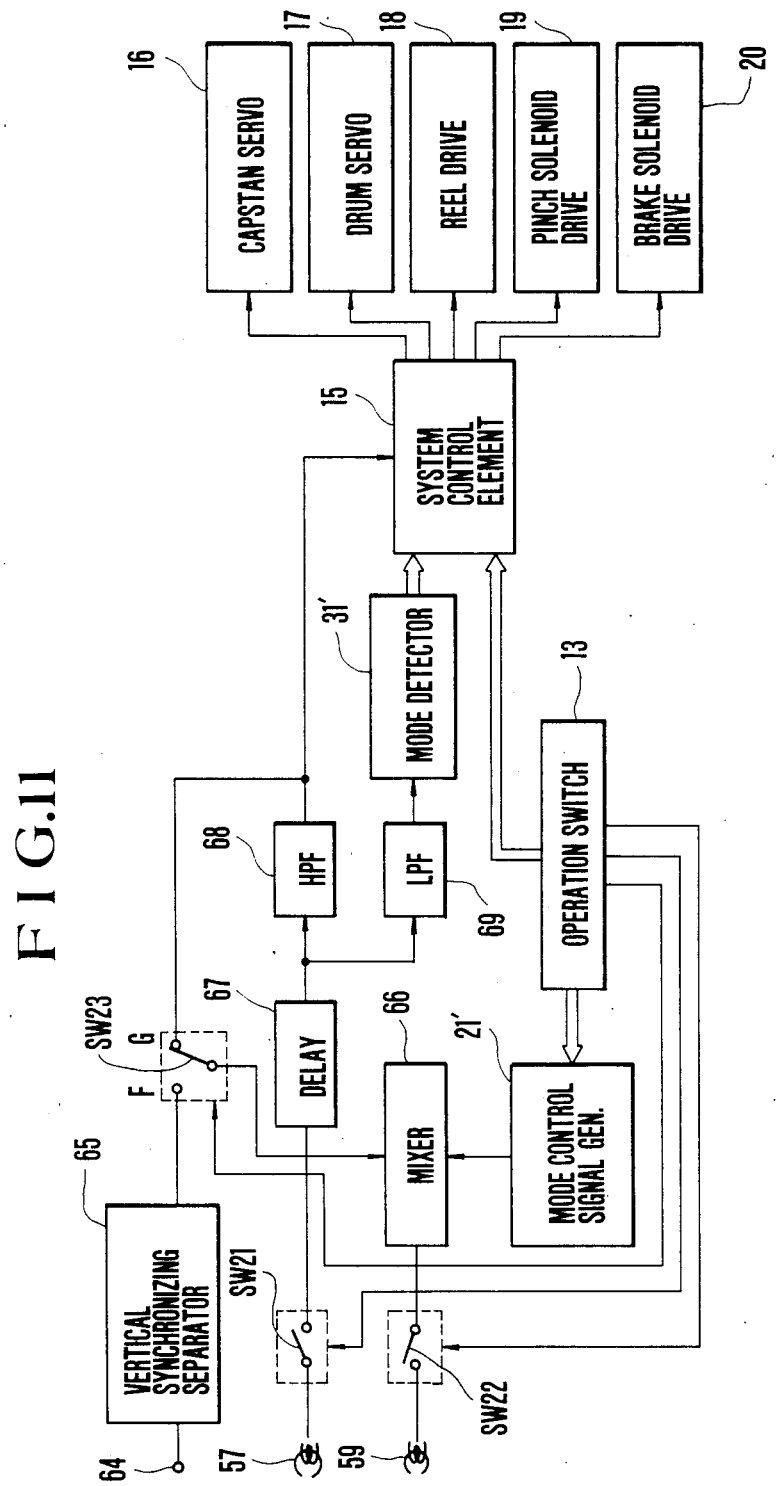
FIG. 11 is a block diagram showing the basic arrangement of the VTR in another embodiment of the invention.

FIG. 9 shows, by way of example, the tape transport system of a VTR according to the present invention in another embodiment thereof. FIG. 10 shows a recording pattern to be drawn on the magnetic tape 1 by the embodiment. The VTR is arranged as shown in FIG. 11. In these drawings, the same parts as those shown in FIGS. 1-3 are indicated by the same reference numerals as in FIGS. 1-3.

In this embodiment, the invention is applied to a VTR of the type wherein, in recording a video signal, the vertical synchronizing signal of the video signal to be recorded is separated; the signal thus obtained is recorded in the longitudinal direction of the tape 1; and, during reproduction, this signal is utilized as a servo control signal (hereinafter called the signal CTL) for controlling the rotation of the drum 2 or the travel of the tape 1. The embodiment has a signal which is obtained by mixing the signal CTL with a mode control signal (hereinafter called the mixed signal) recorded in a mixed signal recording track 60 provided for recording the mixed signal.

Referring to FIG. 9, the embodiment includes a mixed signal reproducing head 57 which reproduces the mixed signal; a mixed signal erasing head 58 which erases the mixed signal track 60; and a mixed signal recording head 59 which records the mixed signal.

In recording a video signal alone, the embodiment operates as follows: When recording the video signal alone is instructed by means of the operation switch 13, a switch SW21 turns off; a switch SW22 turns on; and a switch SW23 is shifted to one side F thereof, as shown in FIG. 11. Referring to FIG. 11, a video signal to be recorded is supplied to a terminal 64. A vertical synchronizing signal which is separated from this video signal by a vertical synchronizing signal separating circuit 65 is supplied via the switch 23 to a mixer 66. At that time, no program signal (mode control signal), is produced from a program (or mode control), signal generator 21'. Therefore, the separated vertical synchronizing signal alone is supplied to the mixed signal recording head 59 to be recorded in the track 60 as the servo control signal CTL. In the meantime, the recording and reproducing heads 3a and 3b record the video signal thus forming oblique tracks 10 on the tape 1.

In the recording both a video signal and a mode control signal, the embodiment operates as follows: When recording, the mode control signal is instructed by means of the operation switch 13 and the output of the mode control signal generator 21' (or the program signal generator 21') is supplied to the mixer 66. In this instance, the mode control signal generator 21 consists of the reference oscillator 22 and a variable amplifier. A sinusoidal wave signal of about 30 Hz is used as a program signal. The correspondence between the program signal (or the mode control signal) and each operation mode is obtained by arranging the recording level of the sinusoidal wave to correspond to each of the operation mode. More specifically, the variable amplifier has three stepwise degrees of amplification to give three different recording levels. The highest level corresponds to the high speed searching reproduction mode; the intermediate level corresponds to slow motion reproduction; and the lowest level corresponds to the standard reproduction mode. The mode control signal which is obtained in this manner is mixed with the servo control signal CTL at the mixer 66. The mixed signal thus obtained is recorded in the track 60 by the head 59.

Let us now consider an instance where a mode control signal, or the mixed signal in this specific embodiment, is to be rewritten alone. When reproduction is to be performed at the standard speed, the switch SW21 is on. A reproduced mixed signal reproduced by the mixed signal reproducing head 28 is delayed by a delay circuit 67 as much as the time axial difference between the heads 57 and 59 for standard recording and reproduction. The delayed mixed signal is supplied to a high-pass filter 68 (hereinafter called HPF) and a low-pass filter (LPF) 69. The servo control signal CTL is separated by the HPF 68 and the mode control signal by the LPF 69 respectively. The servo control signal CTL separated by the HPF 68 is supplied to the system control element 15 and is used by the capstan servo circuit 16 or the drum servo circuit 17 as a reference signal.

When reproduction is performed without using any mode control signal in this manner, the system control element 15 controls each applicable part of the apparatus in response to the instruction signal from the operation switch 13 not only for standard reproduction but also for slow motion reproduction and high speed searching reproduction. Under this condition, when instruction for rewriting the mode control signal is produced, the switch SW22 is turned on. Then, the switch 23 is shifted to the side F thereof, which is shown in FIG. 6. This supplies the servo control signal, which is delayed by the delay circuit 45, to the mixer 66. A new mode control signal is then supplied to the mixer 66 as another input. In the event that the mode control signal is to be cancelled, this can be supplied by preventing any output from the mode control signal generator 21'. The mixed signal reproducing head 57 then reproduces the mixed signal. The mixed signal track 60 is erased by the mixed signal erasing head 58 and a new mixed signal is recorded by the mixed signal recording head 59, so that the mode control signal alone can be rewritten in this manner.

With the embodiment shown in FIG. 10, the operation of the embodiment for control reproduction is as follows: The switch SW21 is on and the switch SW22 off. The mixed signal, which is delayed by the delay circuit 67, is divided into a mode control signal and a servo control signal CTL through the HPF 68 and the LPF 69. The level of the mode control signal is detected by the mode detection element 31' and the mode to which the mode control signal corresponds is thus detected. The data on the mode detected by the mode detection element 31' is supplied to the system control element 15. The whole apparatus in this mode is then controlled.

The embodiment shown in FIGS. 9-11 thus gives the same effects as the embodiment shown in FIGS. 1-3. Furthermore, the arrangement of this embodiment deletes the necessity of providing any additional track for the program signal (the mode control signal). This arrangement thus gives interchangeability with conventional VTR's.

Figure 12:
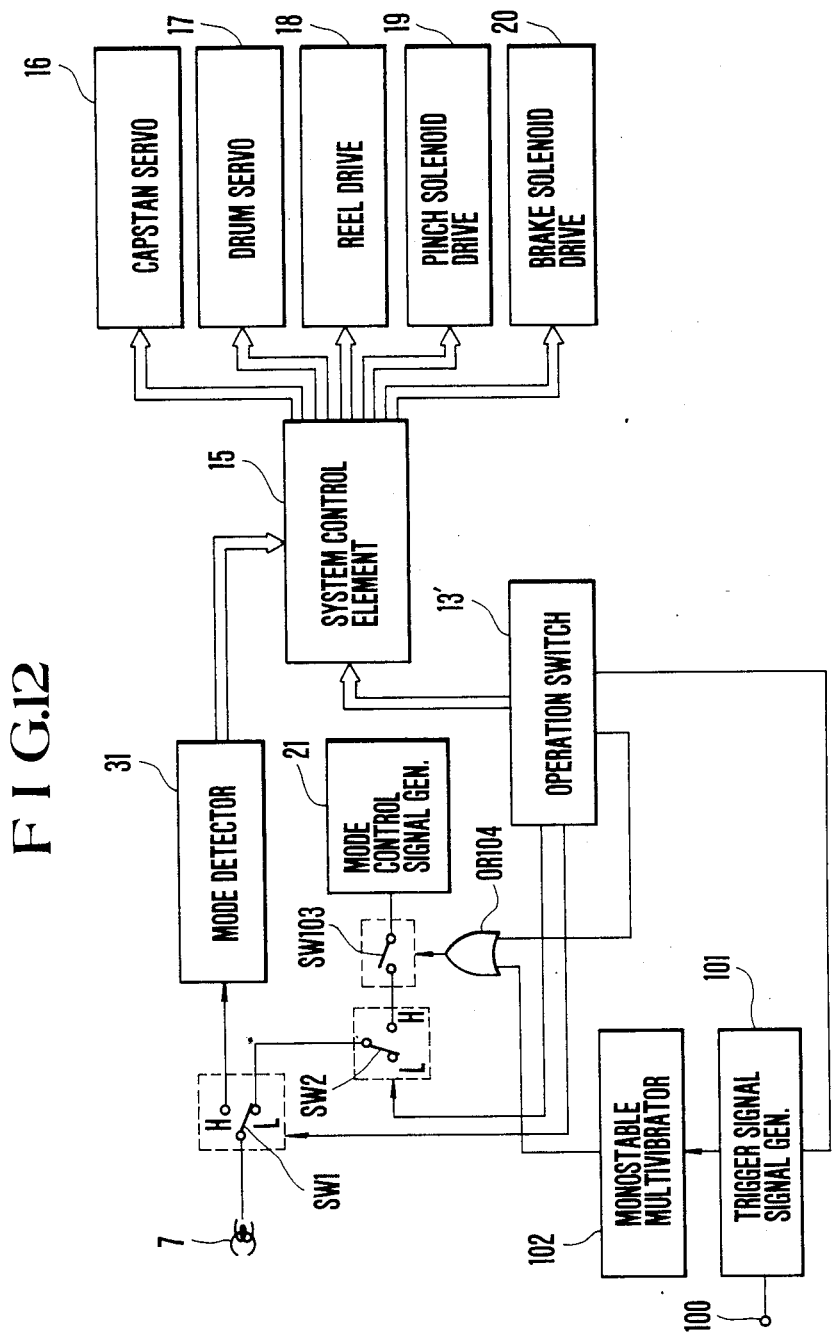
FIG. 12 is a block diagram showing the basic arrangement of a VTR in a further embodiment of the invention.

FIG. 12 shows the basic arrangement of a VTR in another embodiment of this invention. FIG. 13 shows, by way of example, the arrangement of the operation switch 13' and the system control element 15 of the embodiment shown in FIG. 12. In FIG. 12, the components similar to those shown in FIG. 3 are indicated by the same reference numerals as in FIG. 3. Furthermore, in FIG. 13, the parts which coincide with the parts shown in FIG. 4 are also indicated by the same reference numerals and their description is also omitted here.

Referring to FIG. 13, the operation switch 13' includes a switch SW105 which is provided for enabling the apparatus to record a search-out mode control signal. When this switch SW105 is off, an inverter NOT107 constantly produces a high level output. Under this condition, an OR gate OR104, shown in FIG. 12, produces a high level output and a switch SW103 is on. Accordingly, under this condition, the circuit arrangement of FIG. 12 operates in the same manner as the embodiment shown in FIG. 3.

When the switch SW105 is turned on, an operation recording a program signal for searching is performed in the following manner: With the instruction switch SW105 for the search-out program signal turned on, an OR gate OR106 produces a high level output in the same manner as when the switch SW9 is turned on. Then, if any of the switches SW5-SW7 is on at that time, the switch SW2 is shifted to the side H. Meanwhile, an inverter NOT107 produces a low level output allowing the OR gate OR104 to pass the output of a monostable multivibrator 102. In other words, the switch SW103, which has been constantly on, is operated by the output of the monostable multivibrator 102. There is provided a terminal 100 for receiving information as of recording starts from a video camera which is not shown. This information causes a trigger signal generating circuit 101 to produce a pulse in response to the beginning of recording information from the switch SW9. This pulse triggers the monostable multivibrator 102. The output of the monostable multivibrator 102 is then kept at a high level for a predetermined period of time after receipt of the pulse from the trigger signal generating circuit 101 (several seconds). In this manner, a mode control signal is recorded in a position which corresponds to a predetermined length of a video signal portion for the initial part of a scene. This mode control signal can be any signal that corresponds to any mode other than the quick feeding mode.

The arrangement described above permits automatic recording of a mode control signal which corresponds to a predetermined length of a video signal at the initial part of each record. The embodiment, therefore, enables the operator to save writing time during a mode control signal. When, for example, a magnetic tape 1 having the mode control signal which corresponds to the predetermined length of a video signal recorded solely during the initial part of each record is subjected to a control reproducing operation, the initial part of each record is reproduced for several seconds and then the tape 1 is quickly fed, picking out the initial part of the next record. Therefore, the initial parts of desired records can be picked out very quickly even if the tape 1 has a very long recording time.

When the VTR described above is used for unattended recording of TV broadcasts, the record thus obtained tends to include some unwanted part such as commercial messages. In such a situation, if the mode control signal corresponding to standard reproduction is recorded at all parts of the record except the unwanted part, only the desired parts of the record can be reproduced in a controlled reproducing manner while for the undesired part is quick fed. The use of the mode control signal thus gives various advantages in addition to searching for the initial part of a desired record.

In the embodiment described above, the servo control signal CTL and the mode control signal are mixed together and the mixed signal thus obtained is recorded on a part of the magnetic tape 1 usually used as a servo control signal recording track. However, in place of such an arrangement, the mode control signal may be mixed with either an audio signal or a video signal. When mixing it with an audio signal, for example, the mode control signal may be inserted in a lower zone than a bias signal. When mixing it with a video signal, an encoded mode control signal may be inserted in a horizontal or vertical blanking range.

In the embodiments described, the invention is applied to VTR's. However, this invention is not limited to such applications but is, of course, also applicable to information recording and reproducing apparatus of other kinds such as an ordinary audio tape recorder, etc.

As described in the foregoing, in accordance with this invention, desired information alone can be promptly reproduced in a desired reproducing operation mode.

What we claim:

1. An information signal recording and reproducing apparatus, comprising:
   (a) first recording means for recording an information signal on a first area of a tape-shaped recording medium;
   (b) first reproducing means for reproducing the information signal from the first area of the medium;
   (c) second recording means for recording a mode control signal on a second area of the tape-shaped recording medium;
   (d) second reproducing means for reproducing the
   (e) moving means for moving the tape-shaped recording medium in its lengthwise direction;
   (f) manually operable means for designating a mode of the apparatus;
   (g) first data generating means for generating a first mode control data based on the mode control signal reproduced by said second reproducing means;
   (h) second data generating means for generating a second mode control data based on the manual operation for said manually operable means;
   (i) selection means for selecting one of said first mode control data and said second mode control data; and
   (j) mode control means for changing over the apparatus between a first mode and a second mode based on the mode control data selected by said selection means;
   wherein when in said first mode, said moving means moves the medium at a first speed and said first reproducing means reproduces the information signal, and when in said second mode, said moving means moves the medium at a second speed different from said first speed.

2. An apparatus according to claim 1, wherein said first data generating means includes detection means for detecting the level of said mode control signal reproduced by said second reproducing means.

3. An apparatus to claim 1, further comprising:
   first erasing means for erasing only the mode control signal recorded on the medium; and
   second erasing means for erasing at least the information signal recorded on the medium.

4. A video signal recording and reproducing apparatus, comprising:
   (a) first recording means for recording the video signal on a first area of a tape-shaped recording medium while successively forming a plurality of oblique tracks thereon;
   (b) first reproducing means for reproducing the video signal from the first area of the medium, said first reproducing means including at least one rotary head;
   (c) second recording means for recording a mode control signal on a second area of the tape-shaped recording medium;
   (d) second reproducing means for reproducing the mode control signal from the second area of the medium;
   (e) moving means for moving the tape-shaped recording medium in its lengthwise direction;
   (f) manually operable means for designating a mode of the apparatus;
   (g) first data generating means for generating a first mode control data based on the mode control signal reproduced by said second reproducing means;
   (h) second data generating means for generating a second mode control data based on the manual operation for said manually operable means;
   (i) selection means for selecting one of said first mode control data and second mode control data; and
   (j) mode control means for setting the apparatus in one of a plurality of modes including first and second modes on the basis of the mode control data selected by said selection means;
   wherein when the apparatus is in said first mode, said moving means moves the medium at a first speed so that said rotary head of the first reproducing means traces on the medium in parallel to the oblique track, and when the apparatus is in said second mode, said moving means moves the medium at a second speed so that the rotary head of said first reproducing means traces on the medium in a direction so as to run across the oblique track.

5. An apparatus according to claim 4, wherein said second speed is faster than said first speed.

6. An apparatus according to claim 4, wherein said second speed is slower than said first speed.

7. An apparatus according to claim 4, further comprising mode control signal supplying means for selectively supplying a plurality of mode control signals of different kinds corresponding to the plurality of modes of said second recording means.

8. An information signal reproducing apparatus, comprising:
   (a) first reproducing means for reproducing an information signal recorded on a first area of a tape-shaped recording medium;
   (b) second reproducing means for reproducing a mode control signal recorded on a second area of the tape-shaped recording medium;
   (c) moving means for moving the tape-shaped recording medium in its lengthwise direction;
   (d) manually operable means for designating a mode of the apparatus;
   (e) first data generating means for generating a first mode control data based on the mode control signal reproduced by said second reproducing means;
   (f) second data generating means for generating a second mode control data based on the manual operation for said manually operable means;
   (g) selection means for selecting one of said first mode control data and said second mode control data; and
   (h) mode control means for changing over the apparatus between a first mode and a second mode based on the mode control data selected by said selection means;
   wherein when in said first mode, said moving means moves the medium at a first speed and said first reproducing means reproduces the information signal, and when in said second mode, said moving means moves the medium at a second speed different from said first speed and said first reproducing means does not reproduce the information signal.

9. An apparatus according to claim 8, wherein when the apparatus is in said first mode, said first reproducing means reproduces the information signal and when the apparatus is in said second mode, said first reproducing means does not reproduce the information signal.

10. An apparatus according to claim 8, wherein when the apparatus is in said second mode, said moving means moves the medium at a speed faster than the speed when the apparatus is in said first mode.

11. An information signal recording and reproducing apparatus, comprising:
   (a) first recording means for recording an information signal recorded on a first area of a tape-shaped recording medium;
   (b) first reproducing means for reproducing the information signal from the first area of the medium;
   (c) second recording means for recording a control signal having a recording wave length corresponding to the moving speed of the medium and a mode control signal on the second area of the tape-shaped recording medium;
   (d) second reproducing means for reproducing the control signal and mode control signal from the second area of the medium;
   (e) moving means for moving the tape-shaped recording medium in its lengthwise direction;
   (f) control means for controlling the moving speed of the medium by the moving means so as to maintain the frequency of the control signal reproduced by said second reproducing means at a constant frequency;
   (g) mode control means for changing over the apparatus between a first mode and a second mode based on the mode control signal reproduced by said second reproducing means;
   wherein when the apparatus is in said first mode, the moving speed of the medium is determined by said control means, and when the apparatus is in said second mode, the moving speed of the medium by said moving means is not determined by said control means.

12. A video tape recorder, comprising:
   (a) first recording means including at least one rotating head for recording a video signal on a first area of a magnetic tape;
   (b) first reproducing means including at least one rotating head for reproducing the video signal from the first area of the magnetic tape;
   (c) manually operable means for instructing said first recording means to start the recording of the video signal;
   (d) second recording means including at least one fixed head for recording a mark signal on a second area of the magnetic tape only for a predetermined period in response to the manual operation for said manually operable means;
   (e) second reproducing means including at least one fixed head for reproducing the mark signal from the second area of the magnetic tape;
   (f) moving means for moving the magnetic tape in its lengthwise direction; and
   (g) transfer means for transferring the recorder from the second mode to the first mode in response to the reproducing of the mark signal being started by the second reproducing means;
   wherein when the recorder is in said first mode, said moving means moves the tape at a first speed, and when the recorder is in said second mode, said moving means moves the tape at a second speed faster than the first speed.

13. A video tape recorder, comprising:
   (a) first recording means including at least one rotating head for recording a video signal on a first area of a magnetic tape;
   (b) first reproducing means including at least one rotating head for reproducing the video signal from the first area of the magnetic tape;
   (c) second recording means including at least one fixed head for recording a mark signal on a second area of the magnetic tape;
   (d) second reproducing means including at least one fixed head for reproducing the mark signal from the second area of the magnetic tape;
   (e) moving means for moving the magnetic tape in its lengthwise direction; and
   (f) mode control means for bringing the recorder into the first mode only for a predetermined period in response to the reproduction of the mark signal being started by said second reproducing means and maintaining the recorder in the second mode for periods other than said predetermined period;
   wherein when the recorder is in said first mode, said first reproducing means reproduces the video signal and said moving means moves the tape at a first speed, and when the recorder is in said second mode, said moving means moves the tape at a second speed faster than the first speed.

14. A recorder according to claim 13, further comprising instruction means for instructing the second recording means to start the recording of the mark signal.

15. A recorder according to claim 14, wherein said mode control means includes means for causing the second recording means to record the mark signal for a predetermined period in accordance with the intruction of the instruction means.

16. A recorder according to claim 14, wherein said instruction means instructs the second recording means to start the recording of the mark signal and instructs the first recording means to start the recording of the video signal.

* * * * *